US009401577B2

(12) United States Patent
Mitchell et al.

(10) Patent No.: US 9,401,577 B2
(45) Date of Patent: Jul. 26, 2016

(54) RJ-45 INSERTION AND EXTRACTION TOOL

(71) Applicant: EchoStar Technologies L.L.C., Englewood, CO (US)

(72) Inventors: Jason B. Mitchell, New Braunfels, TX (US); Martin S. Foegelle, New Braunfels, TX (US)

(73) Assignee: EchoStar Technologies L.L.C., Englewood, CO (US)

( * ) Notice: Subject to any disclaimer, the term of this patent is extended or adjusted under 35 U.S.C. 154(b) by 46 days.

(21) Appl. No.: 14/450,067

(22) Filed: Aug. 1, 2014

(65) Prior Publication Data

US 2016/0036190 A1 Feb. 4, 2016

(51) Int. Cl.

| | |
|---|---|
| ***B23P 19/00*** | (2006.01) |
| ***H01R 43/00*** | (2006.01) |
| ***H01R 43/26*** | (2006.01) |
| ***B25B 27/14*** | (2006.01) |
| ***H01R 24/64*** | (2011.01) |

(52) U.S. Cl.

CPC ................ *H01R 43/26* (2013.01); *B25B 27/14* (2013.01); *H01R 24/64* (2013.01); *H01R 2201/04* (2013.01); *Y10T 292/0956* (2015.04); *Y10T 292/1089* (2015.04)

(58) Field of Classification Search

CPC .... H01R 2201/04; H01R 13/62; H01R 43/26; H02G 1/08; Y10T 292/0956; Y10T 292/1089

USPC ............. 29/750, 426.1, 426.5, 753, 758, 762, 29/764; 439/344, 352, 354, 372, 542

See application file for complete search history.

(56) References Cited

U.S. PATENT DOCUMENTS

| | | | |
|---|---|---|---|
| 5,210,934 A | 5/1993 | Lenzi et al. | |
| 7,326,075 B1 * | 2/2008 | Armstrong ........... | H01R 13/633 439/354 |
| 7,465,180 B2 * | 12/2008 | Kusuda ............. | H01R 13/6272 439/344 |
| 2007/0011857 A1 | 1/2007 | Francis et al. | |
| 2013/0045616 A1 | 2/2013 | Adams | |
| 2013/0323949 A1 | 12/2013 | De Dios Martin et al. | |

* cited by examiner

*Primary Examiner* — Thiem Phan

(74) *Attorney, Agent, or Firm* — Seed IP Law Group PLLC

(57) ABSTRACT

An RJ-45 insertion and extraction tool is disclosed that allows a user to plug and unplug an RJ-45 connector from an RJ-45 socket in a quick and easy way that does not disturb other cables plugged into adjacent sockets.

11 Claims, 5 Drawing Sheets

RJ-45 INSERTION AND EXTRACTION TOOL

BACKGROUND

1. Technical Field

This invention is in the field of telecommunication tools and, in particular, a tool to plug and unplug RJ-45 connectors from RJ-45 sockets in Ethernet switches or other devices.

2. Description of the Related Art

With the increased popularity of Internet applications there has been a marked increase in the Information Technology (IT) infrastructure needed to support distributed computing, including an increase in the number of Ethernet-based switches and routers. Corporations and commercial computing service providers typically have special areas, typically large, dedicated climate-controlled areas, designated as data-centers where large numbers of computer and network communication equipment is installed and maintained. Within these data centers, devices typically communicate through direct, hardwired Ethernet connections upon which data and commands are communicated using Ethernet protocols. The most common Ethernet connections between devices use CAT5e cable with an RJ-45 connector.

Physical configurations of computer and networking equipment within a datacenter are typically based on rack mounts that allow a large number of components to be compactly stacked on top of each other, in order to maximize the amount of computing power and minimize the amount of floor space taken up with equipment. Equipment designed for use in rack mounts typically has connection sockets for data communication cables at the back of the equipment. This configuration allows an IT professional to have ready access to connection sockets required across multiple equipment to properly connect the computer and networking devices into an operable configuration.

Some of the data communication devices, in particular Ethernet-based switches and routers, have a large number of connection sockets spaced tightly together into which a large number of Ethernet cables must be plugged. In some devices there are over 50 sockets. In addition, as computer and network configurations change, these cables are frequently disconnected and reconnected to different sockets to make the new computer and network configurations operable.

BRIEF SUMMARY

An RJ-45 insertion and extraction tool is disclosed that enables a user to plug and unplug an RJ-45 connector from an RJ-45 socket in a quick and easy way that does not disturb other cables plugged into adjacent sockets.

During use, the RJ-45 tool allows a user to quickly and easily identify the cable to be inserted or removed. The tool includes a housing with an attached handle. In one embodiment, the housing is an open-ended rectangular housing, with an interior dimension approximately the size of the exterior of an RJ-45 connector. A channel is cut in one of the sides of the housing, other than the top side, to allow the cable attached to the RJ-45 connector to be placed inside the rectangular housing. A tine is cut into the middle third of the distal end of the top of the rectangular housing and is bent slightly upwards. During operation, this tine causes the tab on the RJ-45 plug to be pushed down when the RJ-45 connector is inside the tool housing, unlocking the connector from the socket so that the connector may be removed.

DETAILED DESCRIPTION

Figure 1:
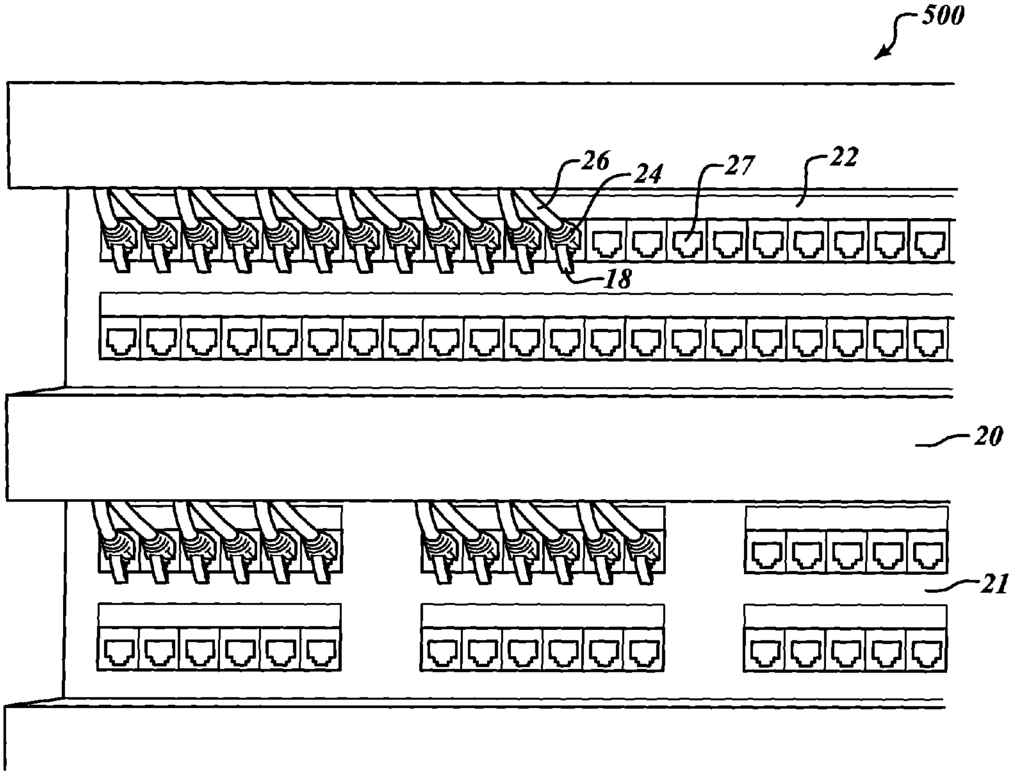
FIG. 1 is a rear view of two network switches with a series of Ethernet connections in the back that are mounted in a rack mount configuration.

FIG. 1 shows picture 500 of the back of two Ethernet-based routers, a first router 21 and a second router 22 that are stacked one on top of the other using rack mount system 20. The backs of the routers contain numerous RJ-45 sockets 27 into which RJ-45 connectors 24 can be inserted. Ethernet cables 26 with RJ-45 connectors 24 are plugged into each of the many sockets 27. The sockets are closely spaced in one or more rows in the back of the router 22. As seen in the first router 21 and the second router 22, when Ethernet cables 26 are plugged into these routers 21, 22, these Ethernet cables 26 are spaced very closely together and can be difficult and cumbersome to access using fingers. To release an RJ-45 connector that is plugged into a socket, it may be necessary to press down on a lever 18 that is attached to a portion of the RJ-45 connector. In this embodiment, the lever 18 pushes down on a tab 30 (not shown) on the RJ-45 connector 24, which releases the connector 24 from the RJ-45 socket 27.

Figure 2:
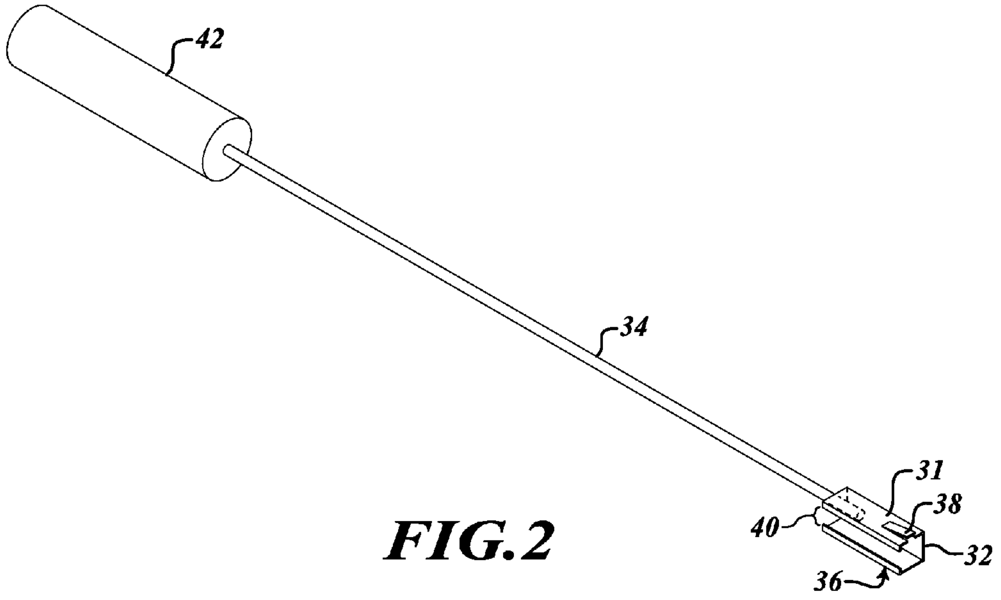
FIG. 2 is a perspective view of one embodiment of the insertion and extraction tool.

FIG. 2 shows one embodiment of a perspective view of the RJ-45 insertion and extraction tool. A handle 42, which is gripped by the hand of a user (not shown), is connected to a long neck 34. In some embodiments, this neck may be of varying lengths, depending upon the ease of accessibility of RJ-45 sockets to the user. In some embodiments, the neck 34 may be a straight rigid rod, or may have various bends or turns in it. In other embodiments, the neck may be articulated at discrete points, or made of a flexible material able to be bent in multiple directions to allow easier access to Ethernet sockets in order to get around obstacles such as rack mount hardware (see FIG. 1, callout 20).

The neck 34 is attached to a housing 32 that has a top side 31 and a bottom side 36 that, when in operation, surrounds the RJ-45 connector 24 within the housing 32. The top face 31 of the housing 32 is also attached to a tine 38 that depresses a lever 31 on the RJ-45 connector 24. Depressing the lever 31 unlocks the RJ-45 connector 24 from the slot 27 and allows the connector to be removed from the socket 27. In some embodiments, the tine 38 is adjustable, either before using the insertion and extraction tool, or during tool use.

In addition, the RJ-45 tool housing 32 includes a channel 40 cut into the side of the housing 32 to allow the Ethernet cable 26 to be inserted into the housing 32. Once this is done, the housing can be slid down the cable and over the RJ-45 connector 24. In other embodiments, the channel 40 may take a number of different forms. For example, the channel may be cut into the sides of the housing, such as the bottom side 36. In other embodiments, the channel may not go completely through a side of the housing, but may, for example, be long enough to allow just enough of cable 26 into the interior of the housing in order to properly seat the RJ-45 connector 24 into the housing 32.

Figure 3:
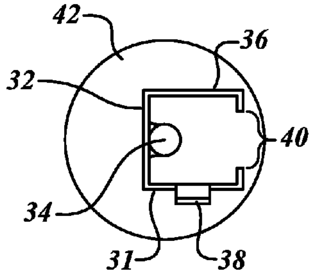
FIG. 3 is a straight-on view of one embodiment of the insertion and extraction tool.

FIG. 3 shows a straight-on view of one embodiment of the insertion and extraction tool, looking into the handle 42 and the attached neck 34. Tine 38 is lifted away from the housing 32 and, in one embodiment, cut directly from face 31 and bent slightly away from the housing.

Figure 4:
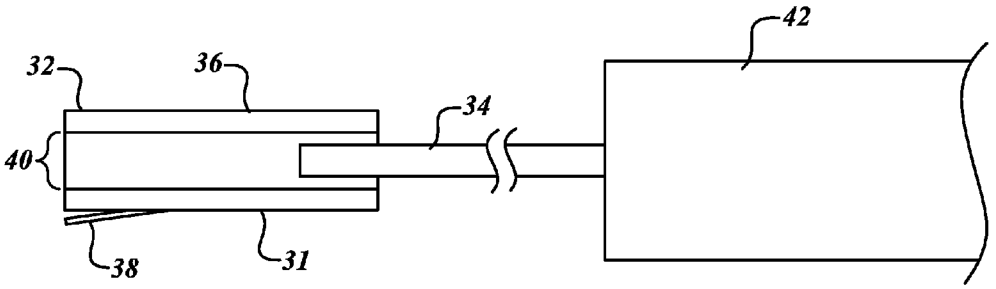
FIG. 4 is a side view of a schematic of one embodiment of the insertion and extraction tool.

FIG. 4 shows a side view of the schematic of one embodiment of the insertion and extraction tool, with handle 42 connected to neck 34, which in turn is connected to housing 32. A side view of the tine 38 that is cut from the housing face 31 and bent slightly outward is shown.

Figure 5:
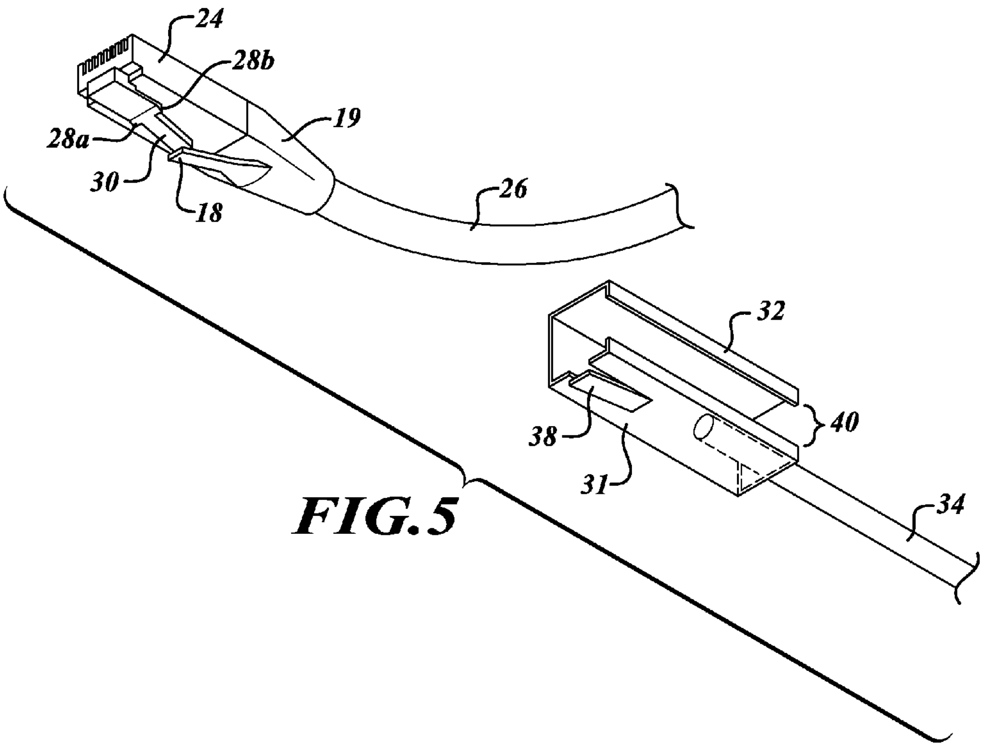
FIG. 5 is a perspective view of one embodiment of an insertion and extraction tool prior to seating an Ethernet cable with an RJ-45 connector.
Figure 6:
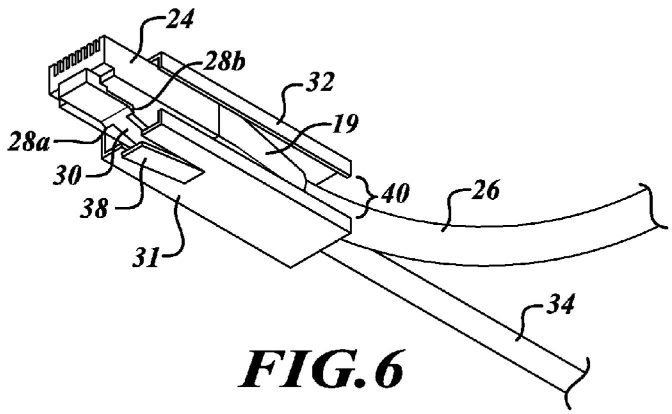
FIG. 6 is a perspective view of one embodiment of an insertion and extraction tool after an Ethernet cable with an RJ-45 connector is seated into the tool.

FIG. 5 is a perspective view of one embodiment of an insertion and extraction tool prior to seating an Ethernet cable having an RJ-45 jack. FIGS. 5 and 6 together show the seating of an RJ-45 jack 24 into the insertion and extraction tool housing 32. In this embodiment, Ethernet cable 26 would lay into the channel 40 within the housing 32. Once this is done, the user brings the Ethernet jack 24 into housing 32 by either pushing the housing 32 toward the RJ-45 jack 24, or pulling the cable 26 toward the user.

In the shown embodiment, RJ-45 jack 24 is connected to tab 30 which lifts slightly off of the main body of the jack 24 in a spring-like fashion. This tab has two wings 28*a*, 28*b* that, when the jack 24 is inserted into a socket 27, snap into a catch in the socket 27 in such a way that the jack 24 cannot be removed unless the tab 30 is pressed, releasing the wings 28*a*, 28*b* from the catch in the socket so that the RJ-45 jack 24 may be removed. In some embodiments, with one example shown, the RJ-45 jack includes a boot 19 that provides additional support for cable 26 where it attaches to connector 24. In this embodiment, there is a lever 18 attached to the boot 19. When the lever 18 is pressed, it presses against tab 30 which depresses the wings 28*a*, 28*b* and allows the RJ-45 jack 24 to be removed from the socket 27. In other embodiments, for example, there is no boot 19 or associated lever 18, and instead tab 30 is depressed directly to remove the connector 24 from the socket 27.

FIG. 6 is a perspective view of one embodiment of an Ethernet cable having an RJ-45 jack seated into an insertion and extraction tool. The RJ-45 connector 24, along with the boot 19, both attached to Ethernet cable 26, is placed all the way inside the housing 32. Tine 38 has pressed lever 18 (not shown) which has, in turn, pressed tab 30 which has depressed the wings 28*a*, 28*b* on the tab, allowing the RJ-45 jack 24 to be removed from a socket 27. Note that the orientation of the tool is such that the tine 38 and either the lever 18 or the tab 30 will be adjacent and touching when the RJ-45 jack is seated in the housing.

As can be readily seen from the figure, in alternative embodiments the tine 38 can depress the tab 30 directly when the RJ-45 jack 24 is completely seated in the housing 32, when there is no boot 19.

FIGS. 7-10 show an example of extracting an RJ-45 jack 24 from a socket 27 using one embodiment of the insertion and extraction tool through a sequence of side views.

Figure 7:
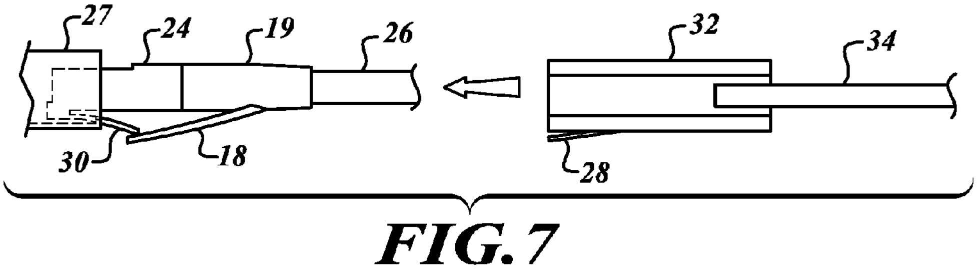
FIG. 7 is a side view of one embodiment of an insertion and extraction tool prior to seating the tool into the RJ-45 connector that is plugged into an RJ-45 socket.

FIG. 7 is a side view of one embodiment of an insertion and extraction tool prior to seating the tool into an RJ-45 24 connector is plugged into RJ-45 socket 27. The insertion and extraction tool housing 32 is being pushed along Ethernet cable 26 towards the housing 19 and the RJ-45 connector 24 that is securely plugged into socket 27.

Figure 8:
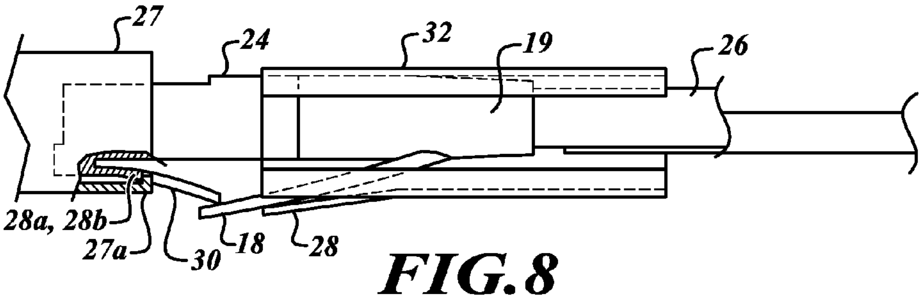
FIG. 8 is a side view of one embodiment of an insertion and extraction tool just as a tool comes into contact with the RJ-45 connector.

FIG. 8 is a side view of the same embodiment as described in FIG. 7, where the insertion and extraction tool housing 32 is pushed over the housing 19, such that the tine 28 is barely in contact with the lever 18, which itself is in contact with the tab 30 of connector 24. Here, the wings 28*a*, 28*b* are still in contact with the socket housing 27*a*, such that the jack 24 cannot be removed from the socket 27 and is "locked in" to it.

Figure 9:
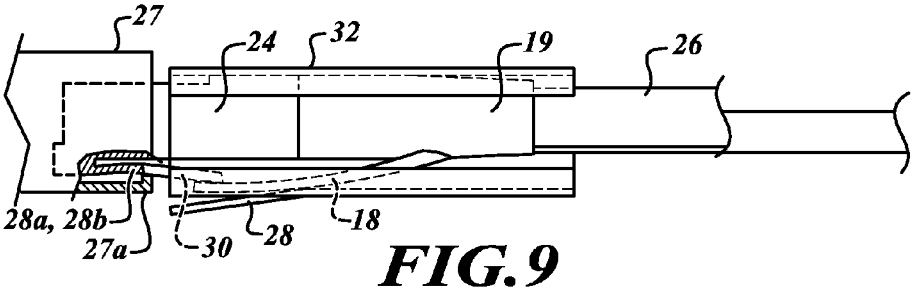
FIG. 9 is a side view of one embodiment of an insertion and extraction tool after the RJ-45 connector is seated into the tool.

FIG. 9 is a side view of the same embodiment as described in FIG. 8, where the insertion and extraction tool housing 32 is pushed further over the boot 19 and jack 27. In this figure, the tine 28 has depressed the lever 18 sufficiently to depress tab 30, depressing the wings 28*a*, 28*b* so that they no longer catch on socket housing 27*a*.

Figure 10:
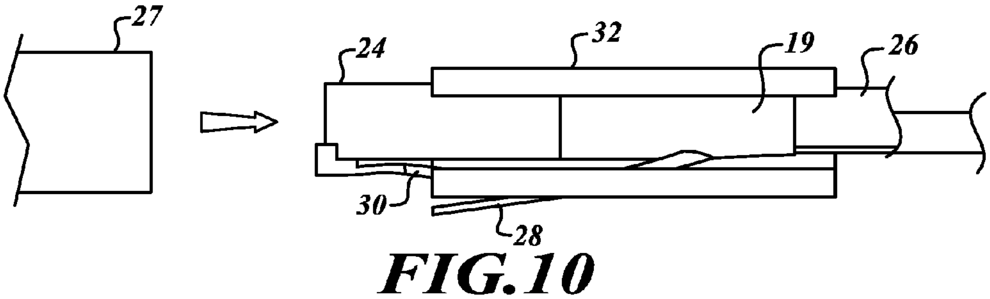
FIG. 10 is a side view of one embodiment of an insertion and extraction tool with an RJ-45 connector seated into the tool, after extraction from an RJ-45 socket.

FIG. 10 is a side view of the same embodiment as described in FIG. 9, where the RJ-45 connector 24 is now easily removed by simply drawing back housing 32.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:

a handle;

a housing connected to the handle, the housing having a rectangular shape with a distal end of the housing open, the distal end having internal dimensions similar to external dimensions of an RJ-45 connector to allow the connector to be inserted into the distal end of the housing, the housing further including:

a top surface that is adjacent to the distal end of the housing;

a tine from a middle third of a distal end of the top surface, the tine bent upward and away from a center of the housing to allow an RJ-45 connector tab to be depressed when the RJ-45 connector is inserted into the distal end of the housing; and a channel cut into a surface adjacent to the distal end of the housing and other than the top surface, the channel starting at the distal end of the housing and allowing an Ethernet cable attached to the RJ-45 connector to be positioned inside the housing when the RJ-45 connector is inserted into the distal end of the housing.

2. The apparatus of claim 1, wherein the housing includes a proximal end that is open.

3. The apparatus of claim 2, wherein the channel cut into the surface continues to the proximal end of the housing.

4. The apparatus of claim 1, wherein the handle includes a neck that is attached to the housing.

5. The apparatus of claim 4, wherein the neck is a straight rod.

6. The apparatus of claim 4, wherein the neck is made of flexible material.

7. The apparatus of claim 4, wherein the neck is articulated in one or more locations.

8. The apparatus of claim 1, wherein the tine is adjustable.

9. The apparatus of claim 1, wherein the connector includes an RJ-11 connector.

10. The apparatus of claim 1, wherein the housing is made of plastic.

11. The apparatus of claim 1, wherein the housing is made of metal.

* * * * *